United States Patent
Qu

(10) Patent No.: US 7,075,799 B2
(45) Date of Patent: Jul. 11, 2006

(54) SELF-DRIVEN SYNCHRONOUS RECTIFIER CIRCUIT

(75) Inventor: Dayu Qu, Malden, MA (US)

(73) Assignee: Power-One, Inc., Camarillo, CA (US)

( * ) Notice: Subject to any disclaimer, the term of this patent is extended or adjusted under 35 U.S.C. 154(b) by 87 days.

(21) Appl. No.: 10/996,977

(22) Filed: Nov. 23, 2004

(65) Prior Publication Data

US 2006/0109698 A1    May 25, 2006

(51) Int. Cl.
*H02M 3/335* (2006.01)
(52) U.S. Cl. .......................... 363/20; 363/127; 363/16
(58) Field of Classification Search ............ 363/16–20, 363/21.4, 127, 131, 77, 89, 53, 95, 97
See application file for complete search history.

(56) References Cited

U.S. PATENT DOCUMENTS

| | | | | |
|---|---|---|---|---|
| 5,663,877 A | * | 9/1997 | Dittli et al. ................. | 363/127 |
| 5,870,299 A | * | 2/1999 | Rozman ....................... | 363/127 |
| 6,069,799 A | * | 5/2000 | Bowman et al. .............. | 363/20 |
| 6,246,592 B1 | * | 6/2001 | Balogh et al. ................ | 363/16 |
| 6,275,401 B1 | | 8/2001 | Xia | |
| 6,650,552 B1 | * | 11/2003 | Takagi et al. ................. | 363/17 |

* cited by examiner

*Primary Examiner*—Rajnikant B. Patel
(74) *Attorney, Agent, or Firm*—Robert D. Atkins; Quarles & Brady Streich Lang LLP

(57) ABSTRACT

A DC-DC power converter has a transformer with a primary side and secondary side. A first power transistor is coupled between a first end of a first winding of the secondary side and a ground terminal. A second power transistor is coupled between a second end of the first winding and the ground terminal. A first driver transistor is coupled to a gate of the first power transistor, and a second driver transistor is coupled to a gate of the second power transistor. A separate driver winding taken off the secondary side of the transformer controls the gates of the first and second driver transistors. First and second inductors are coupled between the opposite ends of the first winding and an output of the power supply. First and second resistors are coupled between the gates of the first and second driver transistors and the ground terminal, respectively.

26 Claims, 2 Drawing Sheets

SELF-DRIVEN SYNCHRONOUS RECTIFIER CIRCUIT

FIELD OF THE INVENTION

The present invention relates in general to power supply circuits and, more particularly, to a self-driven synchronous rectifier circuit for use as a DC-DC power supply.

BACKGROUND OF THE INVENTION

Most modern electronic equipment require a power supply to provide a direct current (DC) operating potential to the electronic components contained therein. Common types of electronic equipment which use power supplies include personal computers, chargers, energy systems, telecommunications, audio-video equipment, consumer electronics, automotive components, and other devices which utilize integrated circuits, semiconductor chips, or otherwise require DC operating potential. Most if not all semiconductor components require a low voltage DC operating potential. However, many sources of electric power are alternating current (AC), or high voltage DC, which must be converted to low voltage DC for the electronic equipment.

In one common arrangement, the AC/DC power supply receives an AC input voltage, e.g., between 110 and 240 VAC, and converts the AC input voltage to the DC operating voltage. The AC voltage is routed through a full-wave rectifier bridge and filtered to produce a high voltage DC signal. The high voltage DC signal is processed through a pulse width modulated (PWM) controller and transformer assembly to generate the low voltage, regulated DC output voltage, which is used as the operating potential for the semiconductor components and other devices requiring low voltage DC supply in the electronic equipment. The low voltage DC signal is typically in the range of 1 to 12 VDC. In other cases, a DC/DC power supply receives a high voltage DC signal and provides the low voltage DC signal necessary for the electronic equipment.

One known power conversion topology is known as push-pull power converter. The push-pull converter has a transformer primary side and secondary side. The secondary side of the push-pull converter typically has power transistors which switch inductor currents to charge the regulated DC output voltage. Driver transistors control the power devices during the different converter operating modes. In many cases, as discussed hereinafter, the power transistors and driver transistors must be screened and matched to achieve acceptable power conversion efficiency. The screening and matching process reduces manufacturability and increases per unit costs.

A need exists for a power converter which does not require screening and matching of the transistors on the secondary side of the transformer.

SUMMARY OF THE INVENTION

In one embodiment, the present invention is a power supply comprising a transformer having a primary winding receiving an input voltage and having first and second windings on a secondary side of the transformer. A driver winding is responsive to the input voltage. A first power transistor has a first conduction terminal coupled to a first end of the first winding, a second conduction terminal coupled to a ground terminal, and a control terminal coupled to a first end of the second winding. A second power transistor has a first conduction terminal coupled to a second end of the first winding, a second conduction terminal coupled to the ground terminal, and a control terminal coupled to a second end of the second winding. A first driver transistor has a first conduction terminal coupled to the control terminal of the first power transistor, a second conduction terminal coupled to the ground terminal, and a control terminal coupled to a first end of the driver winding. A second driver transistor has a first conduction terminal coupled to the control terminal of the second power transistor, a second conduction terminal coupled to the ground terminal, and a control terminal coupled to a second end of the driver winding. A first inductor is coupled between the first end of the first winding and an output of the power supply. A second inductor is coupled between the second end of the first winding and the output of the power supply.

In another embodiment, the present invention is a self-driven synchronous rectification circuit comprising a transformer which has a primary winding receiving an input voltage and having first and second windings on a secondary side of the transformer. A driver winding is responsive to the input voltage. A first power transistor has a first conduction terminal coupled to a first end of the first winding, a second conduction terminal coupled to a ground terminal, and a control terminal coupled to a first end of the second winding. A first driver transistor has a first conduction terminal coupled to the control terminal of the first power transistor, a second conduction terminal coupled to the ground terminal, and a control terminal coupled to a first end of the driver winding. A first inductor is coupled between the first end of the first winding and an output of the power supply.

In another embodiment, the present invention is a power conversion circuit having a transformer with a primary winding receiving an input voltage and first and second windings on a secondary side of the transformer. A driver winding is responsive to the input voltage. A first metal oxide semiconductor field effect transistor (MOSFET) has a drain coupled to a first end of the first winding, a source coupled to a ground terminal, and a gate coupled to a first end of the second winding. A second MOSFET has a drain coupled to the gate of the first MOSFET, a source coupled to the ground terminal, and a gate coupled to a first end of the driver winding.

In another embodiment, the present invention is a DC-DC power converter having a transformer with a primary side responsive to an input voltage and secondary side. A driver winding is responsive to the input voltage. A first power transistor has a first conduction terminal coupled to a first end of a first winding of the secondary side, a second conduction terminal coupled to a ground terminal, and a control terminal coupled to a first end of a second winding of the secondary side. A first driver transistor has a first conduction terminal coupled to the control terminal of the first power transistor, a second conduction terminal coupled to the ground terminal, and a control terminal coupled to a first end of the driver winding.

DETAILED DESCRIPTION OF THE DRAWINGS

The present invention is described in one or more embodiments in the following description with reference to the Figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings.

Figure 1:
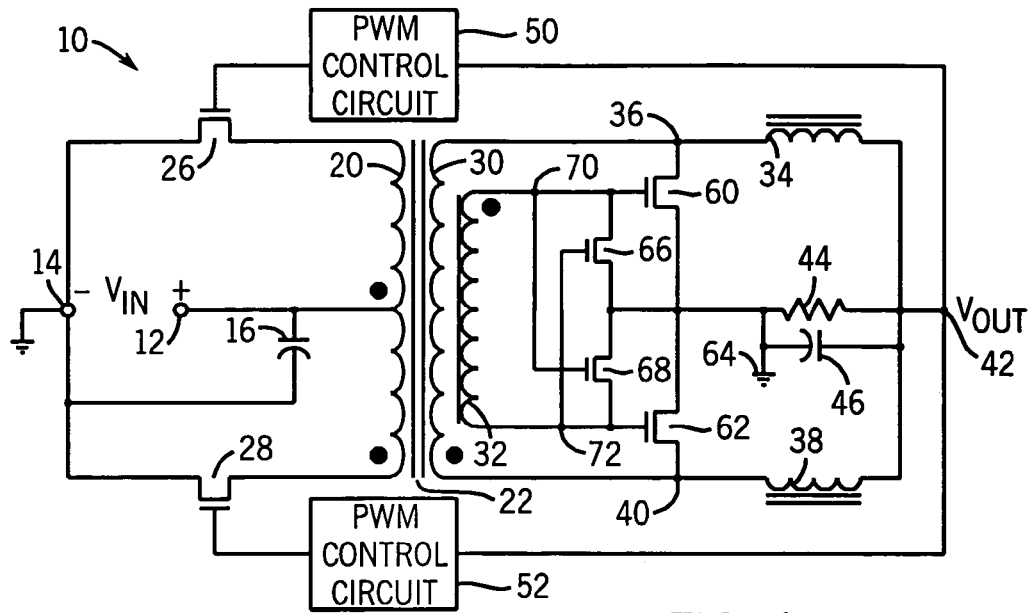
FIG. 1 is a synchronous rectification circuit.

Referring to FIG. 1, a synchronous rectification DC-DC converter 10 is shown having a high DC input voltage $V_{IN}$ which is applied between terminals 12 and 14. DC-DC converter 10 is useful as a power supply for base stations in telecommunication applications. In such cases, the input voltage $V_{IN}$ may be between 36–75 volts. In addition, a rectifier bridge (not shown) may be connected to the front end of DC-Dc converter 10 to convert an AC input voltage to the DC input voltage. Such power converters can also be used in personal computers, chargers, energy systems, telecommunications, audio-video equipment, consumer electronics, and automotive components.

In the present embodiment, the DC-DC converter is shown in a push-pull topology. The push-pull design allows the magnetic flux to be pushed and pulled in both directions from the transformer core, which makes for more efficient use of the transformer core and associated energy transfer. The present invention is applicable to other DC-DC converter design topologies.

The DC input voltage is filtered and smoothed by capacitor 16. The DC input voltage is applied to a center tap of primary winding 20 of transformer 22. Power transistor 26 connects one side of primary winding 20 to ground. Power transistor 28 connects the other side of primary winding 20 to ground. Power transistors 26 and 28 may be implemented as metal oxide semiconductor field effect transistors (MOSFETs). Primary winding 20 has relative winding polarities with respect to the center tap as conventionally shown by the dots.

Transformer 22 has secondary windings 30 and 32. The winding polarities of secondary windings 30 and 32 are shown in FIG. 1. One side of secondary winding 30 is coupled to inductor or choke 34 at node 36. Likewise, the other side of secondary winding 30 is coupled to inductor or choke 38 at node 40. The output voltage $V_{OUT}$ of DC-DC converter 10 is provided at common node 42 between inductors 34 and 38. Load resistor 44 represents the load on DC-DC converter 10. The load may be the telecommunication equipment being supplied by DC-DC converter 10. Capacitor 46 provides filtering and smoothing of the output voltage $V_{OUT}$.

The output voltage $V_{OUT}$ is applied to pulse width modulated (PWM) control circuit 50, which in turn drives the gate of transistor 26. PWM control circuit 50 is responsive to $V_{OUT}$ as a feedback signal to regulate the conduction time of transistor 26 and associated energy storage in primary winding 20. The energy stored in primary winding 20 is transferred to secondary winding 30 during the off time of transistor 26, which maintains the output voltage $V_{OUT}$ to the desired regulated level. The output voltage $V_{OUT}$ is also applied to PWM control circuit 52, which in turn drives the gate of transistor 28. Control circuit 52 is responsive to $V_{OUT}$ as a feedback signal to regulate the conduction time of transistor 28 and associated energy storage in primary winding 20. The energy stored in primary winding 20 is transferred to secondary winding 30 during the off time of transistor 28, which maintains the output voltage $V_{OUT}$ to the desired regulated level, e.g., between 1.8–5.0 volts. The control function for transistors 26 and 28 may be contained in the same PWM control circuit.

A first side of secondary winding 32 is coupled to the gate of MOSFET 60, while the second side of secondary winding 32 is coupled to the gate of MOSFET 62. The drains of transistors 60 and 62 are connected to nodes 36 and 40, respectively. The sources of transistors 60 and 62 are commonly connected to ground terminal 64. The first side of secondary winding 32 is also coupled to the gate of MOSFET 66, while the second side of secondary winding 32 is coupled to the gate of MOSFET 68. The drains of transistors 66 and 68 are connected to the gates of transistors 60 and 62, respectively. The sources of transistors 66 and 68 are commonly connected to ground terminal 64.

The input voltage $V_{IN}$ is applied to the center tap of primary winding 20 of transformer 22. Control circuits 50 and 52 alternately enable transistors 26 and 28 into conduction states in response the output voltage $V_{OUT}$. The gate drive signals from control circuits 50 and 52 have similar duty cycles (similar pulse width) which are 180° out of phase to alternately enable transistors 26 and 28, with a dead band between the adjacent conduction states of the transistors. Transistor 26 is never on at the same time as transistor 28. During the time transistor 26 is conducting, current flows from terminal 12 into the center tap and through primary winding 20 and transistor 26 to terminal 14. When transistor 26 is turned off, the energy stored in primary winding 20 is transferred to secondary windings 30 and 32 by the mutual inductance as indicated. Similarly, during the time transistor 28 is conducting, current flows from terminal 12 into the center tap and through primary winding 20 and transistor 28 to terminal 14. When transistor 28 is turned off, the energy stored in primary winding 20 is transferred to secondary windings 30 and 32 by the mutual inductance as indicated. The energy transferred to secondary windings 30 and 32 is used to generate the output voltage $V_{OUT}$ as describe below. Control circuits 50 and 52 control the conduction periods of transistors 26 and 28 to regulate the amount of energy transfer across transformer 22 so as to maintain a constant output voltage $V_{OUT}$ to varying loads.

On the secondary side of transformer 22, transistors 60 and 62 are controlled by the voltage on opposite ends of secondary winding 32, which have opposing polarities. Transistors 60 and 62 alternately turn on during adjacent overlapping time periods.

Figure 2:
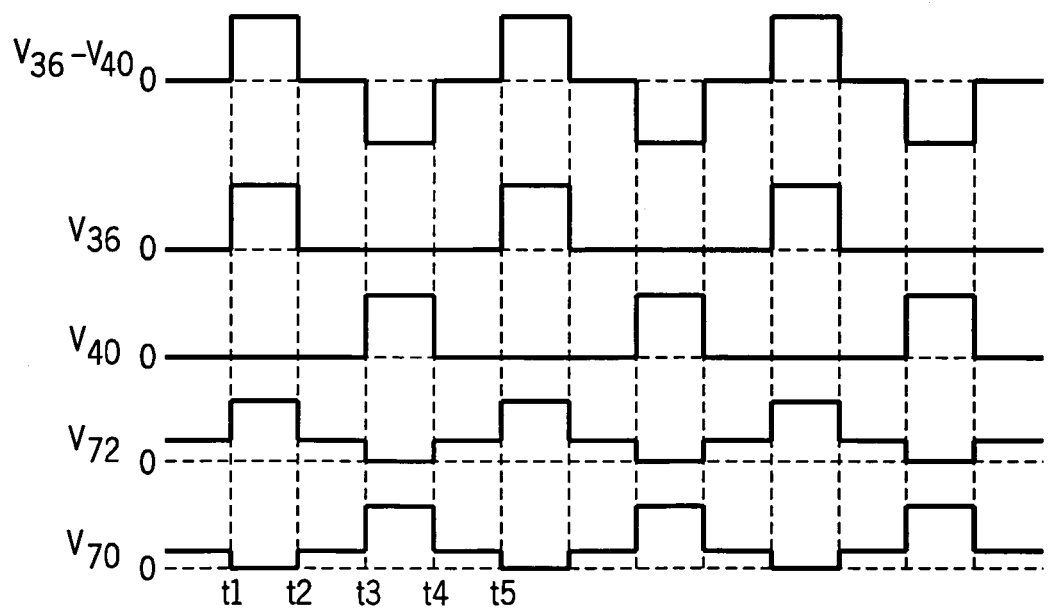
FIG. 2 is a voltage waveform plot of the synchronous rectification circuit.

At time $t_1$ in FIG. 2, power transistor 26 is off and power transistor 28 turns on to charge primary winding 20. By the transformer winding polarities, the voltage at node 72 switches to a high level which turns on power transistor 62 and driver transistor 66. Transistor 66 pulls down on the gate and turns off power transistor 60. The voltage at node 36 switches to a positive level with respect to the voltage at node 40 by the transformer winding polarities. When the voltage on the bottom side of secondary winding 32 is positive with respect to the voltage on the top side of secondary winding 32, a first charging current flows through a first current loop which is formed from node 36, through inductor 34, load 44, transistor 62, and returns to node 36 through secondary winding 30. The first charging current in inductor 34 follows the first current loop because transistor 60 is non-conductive. Capacitor 46 is charged by the first charging current from inductor 34 to maintain the output voltage $V_{OUT}$. A second charging current follows a second current loop which is formed from node 40 through inductor 38, load 44, transistor 62, back to node 40.

At time $t_2$ of FIG. 2, power transistor 28 turns off, although power transistor 26 has not yet turned on. The voltage across secondary winding 30 is zero. Secondary winding 32 becomes shorted causing the gate of transistor 60, 62, 66, and 68 to be commonly connected. The energy charge on gate of transistor 62 discharges through secondary winding 32 to gate of transistor 60. The gate voltages of transistors 60 and 62 fall to a lower shoulder level as shown between times $t_2$ and $t_3$ in FIG. 2. Transistors 60 and 62 both become partially conductive. The shoulder voltage is lower because the gate energy is distributed between the gates of both transistors 60 and 62. Driver transistors 66 and 68 are selected to have high thresholds so that both devices are substantially non-conductive during the time period $t_2$–$t_3$ to prevent discharge of the gates of transistor 60 and 62. The driver transistors 66–68 may not be totally in a non-conductive state because the voltage applied to the gate of transistor 60 and 62 is also applied on gates of transistors 66 and 68.

From times $t_2$ to $t_3$, the driver transistors 66–68 discharge some power from the gates of power transistors 60–62. The discharging rate depends in part on the threshold voltage, transconductance of the driver transistors 66–68, peak gate voltage of power transistors 60–62, and circuit impedance. At high line, the time period $t_2$–$t_3$ is longer and peak gate voltage is higher. As a result, the shoulder voltage on gates of transistors 60–62 is lower because driver transistors 66–68 have a longer time to discharge the energy until the gates of driver transistors 66–68 are well below the respective threshold voltages.

Time $t_3$ of FIG. 2 begins the opposite phase of the primary side switch. Power transistor 26 turns on to charge primary winding 20. By the transformer winding polarities, the voltage at node 70 switches to a high level which turns on power transistor 60 and driver transistor 68. Transistor 68 pulls down on the gate and turns off power transistor 62. The voltage at node 40 switches to a positive level with respect to the voltage at node 36 by the transformer winding polarities. When the voltage on the top side of secondary winding 32 is positive with respect to the voltage on the bottom side of secondary winding 32, a third charging current flows through a third current loop which is formed from node 40, through inductor 38, load 44, transistor 60, and returns to node 40 through secondary winding 30. The third charging current in inductor 38 follows the third current loop because transistor 62 is non-conductive. Capacitor 46 is charged by the third charging current from inductor 38 to maintain the output voltage $V_{OUT}$. A fourth charging current follows a fourth current loop which is formed from node 36 through inductor 34, load 44, transistor 60, back to node 36. The DC-DC converter operates in a similar manner as described for the first and second current loops during times $t_1$–$t_2$ and times $t_2$–$t_3$. At time $t_4$, the energy stored in the gate of power transistor 60 discharges to the gate of power transistor 62. The gate voltages of power transistors 60 and 62 operate at the lower shoulder level from time $t_4$ to time $t_5$.

The efficiency of DC-DC converter 10 is affected by the shoulder voltages, which are influenced by threshold voltages of driver transistors 66–68 and power transistors 60–62. If the shoulder voltage is too low, power transistors 60–62 do not fully turn on, which causes high conduction loss in transistors 60–62. In most cases, the shoulder voltage cannot be too high because it is clamped by the threshold voltage levels of driver transistors 66–68. Accordingly, the gate threshold voltage of driver transistors 66–68 should be made appreciably higher than gate threshold voltage of power transistors 60–62.

In one embodiment, power transistors 60–62 are made to be 30V, 18 A high power devices, while the driver transistors 66–68 are made to be 100V, 2.6 A low power devices. It is important in the DC-DC converter arrangement of FIG. 1 to maintain close tolerance of the threshold voltage variation of the transistors in the secondary side. For high efficiency operation, the power transistors are screened and matched to have lower threshold voltage (<1.75V) and the driver transistors are screened and matched to have higher threshold voltage (>3.2V). It is difficult to screen and match devices such that the larger devices have a lower threshold and the smaller devices have the higher threshold. Nonetheless, the converter efficiency will likely drop if the threshold voltage of the driver transistor falls below 3.0V and/or if the threshold voltage of the power transistor rises above 2.0V.

Figure 3:
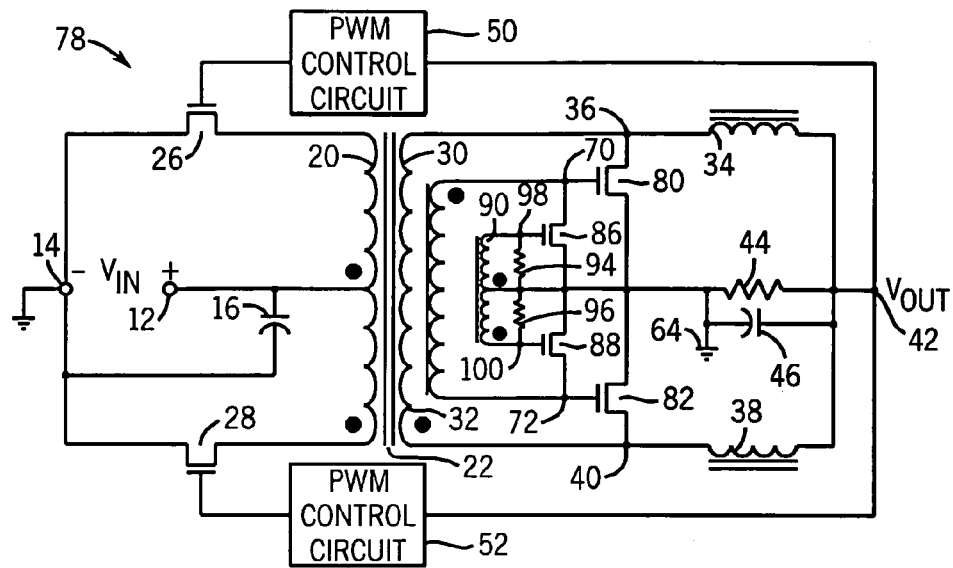
FIG. 3 is a self-driven synchronous rectification circuit.

Turning to FIG. 3, a self-driven synchronous rectification DC-DC converter 78 is shown. Circuit components having a similar function are given the same reference number used in FIG. 1. The primary side of DC-DC converter 78 operates as described in FIG. 1. However, the secondary side of DC-DC converter 78 operates in a different manner than that described for DC-DC converter 10. In general, the secondary side of DC-DC converter 78 operates to keep the gate drive voltages of both power MOSFETs 80 and 82 above zero during the entire conduction period, which increases the power conversion efficiency and eliminates the need for transistor screening and matching.

On the secondary side of transformer 22, power transistors 80 and 82 are controlled by the voltage on opposite ends of secondary winding 32, which have opposing polarities. Transistors 80 and 82 alternately turn on during adjacent overlapping time periods. DC-DC converter 78 further includes a driver winding 90 which controls the gates of driver MOSFETs 86 and 88. The voltage across driver winding 90 is responsive to the input voltage $V_{IN}$. In one embodiment, driver winding 90 is a separate secondary winding of transformer 22. In another embodiment, the driver winding can be provided from a second transformer operating in parallel with transformer 22. The driver winding 90 has relative winding polarities as conventionally shown by the dots. The center tap of driver winding 90 is coupled to ground terminal 64. The drains of driver transistors 86–88 are coupled to the gates of power transistors 80 and 82, respectively. The sources of driver transistors 86–88 are coupled to ground terminal 64. Resistors 94 and 96 are coupled between the gates of driver transistors 86–88 and ground terminal 64 as shown.

Figure 4:
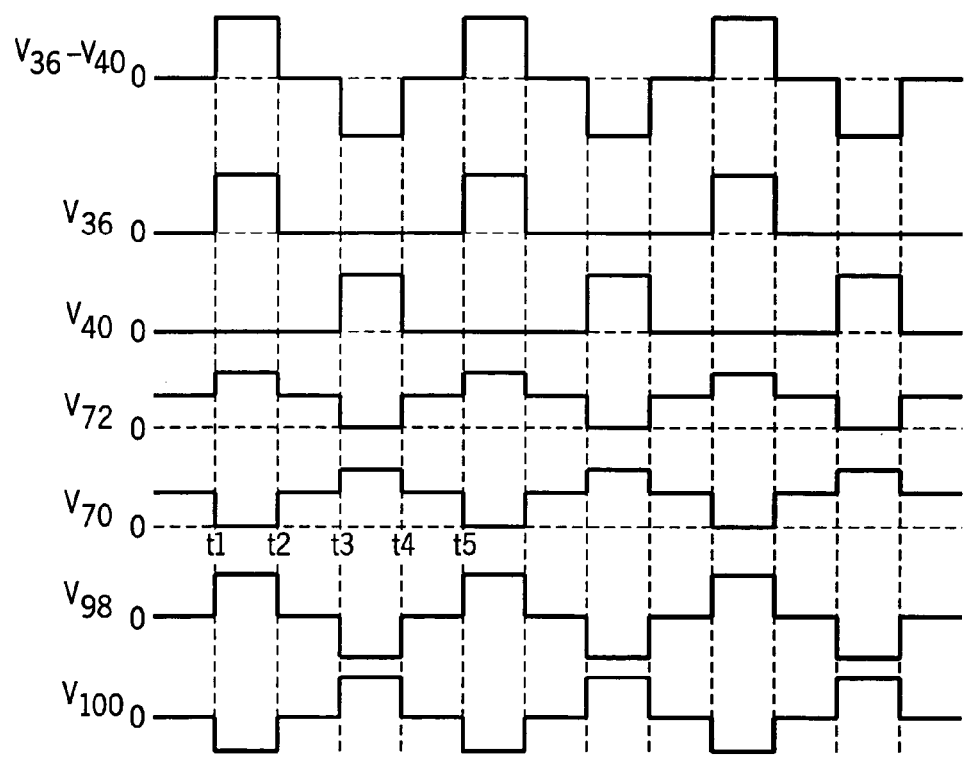
FIG. 4 is a voltage waveform plot of the self-driven synchronous rectification circuit.

At time $t_1$ of FIG. 4, power transistor 26 is off and power transistor 28 turns on to charge primary winding 20. By the transformer winding polarities, the voltage at node 72 switches to a high level which turns on power transistor 82. The voltage at node 98 also switches to a high level to turn on driver transistor 86. Resistor 94 reduces the ringing on the gate of transistor 86. Transistor 86 pulls down on the gate and turns off power transistor 80. The voltage at node 36 switches to a positive level with respect to the voltage at node 40 by the transformer winding polarities. When the voltage on the bottom side of secondary winding 32 is positive with respect to the voltage on the top side of secondary winding 32, a first charging current flows through a first current loop which is formed from node 36, through inductor 34, load 44, transistor 82, and returns to node 36 through secondary winding 30. The first charging current in inductor 34 follows the first current loop because transistor 80 is non-conductive. Capacitor 46 is charged by the first charging current from inductor 34 to maintain the output voltage $V_{OUT}$. A second charging current follows a second current loop which is formed from node 40 through inductor 38, load 44, transistor 82, back to node 40.

At time $t_2$ in FIG. 4, power transistor 28 turns off, although power transistor 26 has not yet turned on. The voltage across secondary winding 30 is zero causing the secondary side to go into freewheeling mode. Secondary driver winding 90 is shorted causing the gates of transistors 86 and 88 to be commonly connected to ground. The driver transistors 86 and 88 are non-conductive, i.e., no current flows through the devices. Secondary winding 32 is also shorted causing the gates of power transistors 80 and 82 to be commonly connected together by the shorted winding. The energy charge on gate of transistor 82 discharges through secondary winding 32 to gate of transistor 80. The gate voltages of transistors 80 and 82 go to a non-zero lower shoulder level as shown between times $t_2$ and $t_3$ in FIG. 4. Transistors 80 and 82 both become partially conductive. The shoulder voltage is lower because the gate energy is distributed between the gates of transistors 80 and 82. Because both driver transistors 86 and 88 are non-conductive, there is no discharging path for the gates of power transistors 80 and 82 during the freewheeling period from time $t_2$ to time $t_3$. The gate drive voltages of power transistors 80 and 82 are thus maintained above zero during the freewheeling conduction period.

Time $t_3$ of FIG. 4 begins the opposite phase of the primary side switch. Power transistor 26 turns on to charge primary winding 20. By the transformer winding polarities, the voltage at node 70 switches to a high level which turns on power transistor 80. The voltage at node 100 also switches to a high level to turn on driver transistor 88. Resistor 96 reduces the ringing on the gate of transistor 88. Transistor 88 pulls down on the gate and turns off power transistor 82. The voltage at node 40 switches to a positive level with respect to the voltage at node 36 by the transformer winding polarities. When the voltage on the top side of secondary winding 32 is positive with respect to the voltage on the bottom side of secondary winding 32, a third charging current flows through a third current loop which is formed from node 40, through inductor 38, load 44, transistor 80, and returns to node 40 through secondary winding 30. The third charging current in inductor 38 follows the third current loop because transistor 82 is non-conductive. Capacitor 46 is charged by the third charging current from inductor 38 to maintain the output voltage $V_{OUT}$. A fourth charging current follows a fourth current loop which is formed from node 36 through inductor 34, load 44, transistor 80, back to node 36.

The DC-DC converter operates in a similar manner as described for the first and second current loops during times $t_1$–$t_2$ and times $t_2$–$t_3$. At time $t_4$, the energy stored in the gate of power transistor 80 discharges to the gate of power transistor 82. The gate voltages are held at the lower non-zero shoulder level because of the gate energy is distributed between the gates of transistors 80 and 82. Because both driver transistors 86 and 88 are non-conductive, there is no discharging path for the gates of power transistors 80 and 82 during the freewheeling period from time $t_2$ to time $t_3$. The gate drive voltages of power transistors 80 and 82 are thus maintained above zero during the freewheeling conduction period. The gate energy is fully preserved in gates of power transistors during freewheeling period. As a result, the shoulder voltage is higher allowing the power transistors 80–82 to turn on harder.

The self-driven synchronous rectification DC-DC converter increases the gate voltage of the power transistors during secondary side freewheeling period, which pushes the power devices to turn on harder and results in lower conduction loss. The self-driven synchronous rectification DC-DC converter topology makes converter efficiency independent of gate threshold voltage of the driver transistors, which simplifies design and gives wider selection of power and driver transistors. The secondary driver winding in combination with driver transistors eliminates the need to screen or match transistors for the secondary side, which helps manufacturability and reduces per unit costs. A wider range of field effect transistors can be the driver and power transistors.

While one or more embodiments of the present invention have been illustrated in detail, the skilled artisan will appreciate that modifications and adaptations to those embodiments may be made without departing from the scope of the present invention as set forth in the following claims.

What is claimed is:

1. A power supply, comprising:
  a transformer having a primary winding receiving an input voltage and having first and second windings on a secondary side of the transformer;
  a driver winding responsive to the input voltage;
  a first power transistor having a first conduction terminal coupled to a first end of the first winding, a second conduction terminal coupled to a ground terminal, and a control terminal coupled to a first end of the second winding;
  a second power transistor having a first conduction terminal coupled to a second end of the first winding, a second conduction terminal coupled to the ground terminal, and a control terminal coupled to a second end of the second winding;
  a first driver transistor having a first conduction terminal coupled to the control terminal of the first power transistor, a second conduction terminal coupled to the ground terminal, and a control terminal coupled to a first end of the driver winding;
  a second driver transistor having a first conduction terminal coupled to the control terminal of the second power transistor, a second conduction terminal coupled to the ground terminal, and a control terminal coupled to a second end of the driver winding;
  a first inductor coupled between the first end of the first winding and an output of the power supply; and
  a second inductor coupled between the second end of the first winding and the output of the power supply.

2. The power supply of claim 1, wherein the driver winding includes a center tap coupled to the ground terminal.

3. The power supply of claim 1, further including a capacitor coupled between the output of the power supply and the ground terminal.

4. The power supply of claim 1, further including:
  a first resistor coupled between the control terminal of the first driver transistor and the ground terminal; and
  a second resistor coupled between the control terminal of the second driver transistor and the ground terminal.

5. The power supply of claim 1, wherein the first and second power transistors are metal oxide semiconductor field effect transistors.

6. The power supply of claim 1, wherein the first and second driver transistors are metal oxide semiconductor field effect transistors.

7. The power supply of claim 1, wherein the primary winding includes a center tap coupled for receiving the input voltage.

8. The power supply of claim 1, further including:
   a third power transistor having a first conduction terminal coupled to a first end of the primary winding, and a second conduction terminal coupled to the ground terminal;
   a first pulse width modulated (PWM) control circuit having an input coupled to the output of the power supply and an output coupled to a control terminal of the third power transistor;
   a fourth power transistor having a first conduction terminal coupled to a second end of the primary winding, and a second conduction terminal coupled to the ground terminal; and
   a second PWM control circuit having an input coupled to the output of the power supply and an output coupled to a control terminal of the fourth power transistor.

9. A self-driven synchronous rectification circuit, comprising:
   a transformer having a primary winding receiving an input voltage and having first and second on a secondary side of the transformer;
   a driver winding responsive to the input voltage;
   a first power transistor having a first conduction terminal coupled to a first end of the first winding, a second conduction terminal coupled to a ground terminal, and a control terminal coupled to a first end of the second winding;
   a first driver transistor having a first conduction terminal coupled to the control terminal of the first power transistor, a second conduction terminal coupled to the ground terminal, and a control terminal coupled to a first end of the driver winding; and
   a first inductor coupled between the first end of the first winding and an output of the power supply.

10. The self-driven synchronous rectification circuit of claim 9, comprising:
    a second power transistor having a first conduction terminal coupled to a second end of the first winding, a second conduction terminal coupled to the ground terminal, and a control terminal coupled to a second end of the second winding;
    a second driver transistor having a first conduction terminal coupled to the control terminal of the second power transistor, a second conduction terminal coupled to the ground terminal, and a control terminal coupled to a second end of the driver winding; and
    a second inductor coupled between the second end of the first winding and the output of the power supply.

11. The self-driven synchronous rectification circuit of claim 10, further including:
    a first resistor coupled between the control terminal of the first driver transistor and the ground terminal; and
    a second resistor coupled between the control terminal of the second driver transistor and the ground terminal.

12. The self-driven synchronous rectification circuit of claim 10, wherein the primary winding includes a center tap coupled for receiving the input voltage.

13. The self-driven synchronous rectification circuit of claim 10, further including:
    a third power transistor having a first conduction terminal coupled to a first end of the primary winding, and a second conduction terminal coupled to the ground terminal;
    a first pulse width modulated (PWM) control circuit having an input coupled to the output of the power supply and an output coupled to a control terminal of the third power transistor;
    a fourth power transistor having a first conduction terminal coupled to a second end of the primary winding, and a second conduction terminal coupled to the ground terminal; and
    a second PWM control circuit having an input coupled to the output of the power supply and an output coupled to a control terminal of the fourth power transistor.

14. The self-driven synchronous rectification circuit of claim 9, wherein the driver winding includes a center tap coupled to the ground terminal.

15. In a power conversion circuit, a transformer having a primary winding receiving an input voltage and having first and second windings on a secondary side of the transformer, the power conversion circuit comprising:
    a driver winding responsive to the input voltage;
    a first metal oxide semiconductor field effect transistor (MOSFET) having a drain coupled to a first end of the first winding, a source coupled to a ground terminal, and a gate coupled to a first end of the second winding; and
    a second MOSFET having a drain coupled to the gate of the first MOSFET, a source coupled to the ground terminal, and a gate coupled to a first end of the driver winding.

16. The power conversion circuit of claim 15, further including:
    a third MOSFET having a drain coupled to a second end of the first winding, a source coupled to the ground terminal, and a gate coupled to a second end of the second winding;
    a fourth MOSFET having a drain coupled to the gate of the third MOSFET, a source coupled to the ground terminal, and a gate coupled to a second end of the driver winding;
    a first inductor coupled between the first end of the first winding and an output of the power supply; and
    a second inductor coupled between the second end of the first winding and the output of the power supply.

17. The power conversion circuit of claim 16, further including:
    a first resistor coupled between the gate of the second MOSFET and the ground terminal; and
    a second resistor coupled between the gate of the fourth MOSFET and the ground terminal.

18. The power conversion circuit of claim 15, wherein the driver winding includes a center tap coupled to the ground terminal.

19. In a DC-DC power converter, a transformer having a primary side responsive to an input voltage and having a secondary side, the DC-DC power converter comprising:
    a driver winding responsive to the input voltage;
    a first power transistor having a first conduction terminal coupled to a first end of a first winding of the secondary side, a second conduction terminal coupled to a ground terminal, and a control terminal coupled to a first end of a second winding of the secondary side; and
    a first driver transistor having a first conduction terminal coupled to the control terminal of the first power transistor, a second conduction terminal coupled to the ground terminal, and a control terminal coupled to a first end of the driver winding.

20. The DC-DC power converter of claim 19, further including:

a second power transistor having a first conduction terminal coupled to a second end of the first winding, a second conduction terminal coupled to the ground terminal, and a control terminal coupled to a second end of the second winding;

a second driver transistor having a first conduction terminal coupled to the control terminal of the second power transistor, a second conduction terminal coupled to the ground terminal, and a control terminal coupled to a second end of the driver winding;

a first inductor coupled between the first end of the first winding and an output of the power supply; and a second inductor coupled between the second end of the first winding and the output of the power supply.

21. The DC-DC power converter of claim 20, further including:

a first resistor coupled between the control terminal of the first driver transistor and the ground terminal; and a second resistor coupled between the control terminal of the second driver transistor and the ground terminal.

22. The DC-DC power converter of claim 20, wherein the first and second power transistors are metal oxide semiconductor field effect transistors.

23. The DC-DC power converter of claim 20, wherein the first and second driver transistors are metal oxide semiconductor field effect transistors.

24. The DC-DC power converter of claim 20, wherein the primary winding includes a center tap coupled for receiving the input voltage.

25. The DC-DC power converter of claim 20, further including:

a third power transistor having a first conduction terminal coupled to a first end of the primary winding, and a second conduction terminal coupled to the ground terminal;

a first pulse width modulated (PWM) control circuit having an input coupled to the output of the power supply and an output coupled to a control terminal of the third power transistor;

a fourth power transistor having a first conduction terminal coupled to a second end of the primary winding, and a second conduction terminal coupled to the ground terminal; and a second PWM control circuit having an input coupled to the output of the power supply and an output coupled to a control terminal of the fourth power transistor.

26. The DC-DC power converter of claim 19, wherein the driver winding includes a center tap coupled to the ground terminal.

* * * * *